United States Patent
Chouhan

(10) Patent No.: US 12,524,789 B2
(45) Date of Patent: Jan. 13, 2026

(54) DEFINING DATA STRUCTURES AND ALGORITHMS FOR PROTOBUF BASED DIFFERENTIAL MANAGEMENT SYSTEMS

(71) Applicant: Google LLC, Mountain View, CA (US)

(72) Inventor: Mahendra Chouhan, Karnataka (IN)

(73) Assignee: Google LLC, Mountain View, CA (US)

( * ) Notice: Subject to any disclaimer, the term of this patent is extended or adjusted under 35 U.S.C. 154(b) by 120 days.

(21) Appl. No.: 18/499,506

(22) Filed: Nov. 1, 2023

(65) Prior Publication Data

US 2025/0139676 A1    May 1, 2025

(51) Int. Cl.
*G06F 16/22*    (2019.01)
*G06Q 30/0601*   (2023.01)

(52) U.S. Cl.
CPC ..... *G06Q 30/0603* (2013.01); *G06F 16/2246* (2019.01)

(58) Field of Classification Search
None
See application file for complete search history.

(56) References Cited

U.S. PATENT DOCUMENTS

| | | | | |
|---|---|---|---|---|
| 7,552,116 B2 * | 6/2009 | Chang | ................... | G06F 40/30 |
| | | | | 707/999.005 |
| 8,375,136 B2 * | 2/2013 | Roman | ................. | H04L 67/125 |
| | | | | 709/229 |
| 10,394,532 B2 * | 8/2019 | Bar-Or | ...................... | G06F 8/35 |
| 10,956,676 B2 * | 3/2021 | Zhuk | ...................... | G06Q 10/10 |
| 2004/0103393 A1 * | 5/2004 | Reddy | ....................... | G06F 8/71 |
| | | | | 717/121 |
| 2013/0080393 A1 * | 3/2013 | Bird | ....................... | G06F 16/219 |
| | | | | 707/649 |
| 2013/0138733 A1 * | 5/2013 | Heinrich | ................ | G06F 40/143 |
| | | | | 709/204 |
| 2013/0155068 A1 * | 6/2013 | Bier | ........................ | G06Q 10/06 |
| | | | | 345/440 |
| 2016/0248636 A1 * | 8/2016 | Filatov | ................... | G06F 3/0481 |
| 2018/0011655 A1 * | 1/2018 | Gredler | ................ | G06F 16/2282 |
| 2020/0341855 A1 * | 10/2020 | Tanwer | ................ | G06F 11/1464 |
| 2020/0395008 A1 * | 12/2020 | Cohen | .................... | G06F 40/268 |

(Continued)

OTHER PUBLICATIONS

Apel et al., "Semistructured Merge in Revision Control Systems", VaMoS, Jan. 2010, 8 pp.

(Continued)

*Primary Examiner* — Eliyah S. Harper
(74) *Attorney, Agent, or Firm* — Shumaker & Sieffert, P.A.

(57) ABSTRACT

A method for differential management includes obtaining a first instance and a second instance of content of a content management system, the first instance including a first plurality of objects of the content, and the second instance including a second plurality of objects of the content. The method includes determining a first tree data structure representing the first plurality of objects at the first instance and a second tree data structure representing the second plurality of objects at the second instance. The method includes identifying, based on a comparison of the first tree data structure and the second tree data structure, a set of deltas. The method includes transmitting, to a client device, the set of deltas that, when received by the client device, cause the client device to display the set of deltas via a user-interface of the client device.

20 Claims, 7 Drawing Sheets

(56) References Cited

U.S. PATENT DOCUMENTS

| | | | |
|---|---|---|---|
| 2021/0124799 A1* | 4/2021 | Gatter | G06F 40/12 |
| 2021/0342144 A1* | 11/2021 | Huang | G06F 11/3688 |
| 2022/0169263 A1* | 6/2022 | Li | G01S 17/89 |
| 2022/0172607 A1* | 6/2022 | Guan | G08G 1/052 |
| 2023/0385487 A1* | 11/2023 | Sun | G06F 30/27 |
| 2024/0414061 A1* | 12/2024 | Palavalli | H04L 41/0866 |
| 2025/0139676 A1* | 5/2025 | Chouhan | G06Q 30/0603 |

OTHER PUBLICATIONS

Baudiš, "Current Concepts in Version Control Systems", arXiv:1405.3496v1, May 14, 2014, 23 pp.

Westfechtel, "Structure-Oriented Merging of Revisions of Software Documents", Proceedings of the 3rd international workshop on Software configuration management, ACM, May 1991, 12 pp.

* cited by examiner

DEFINING DATA STRUCTURES AND ALGORITHMS FOR PROTOBUF BASED DIFFERENTIAL MANAGEMENT SYSTEMS

TECHNICAL FIELD

This disclosure relates to defining data structures and algorithms for protobuf based differential management systems.

BACKGROUND

Structured data, unlike unstructured or semi-structured data, is data that is in a standardized format. Protocol Buffers, also known as protobufs, are language and platform neutral extensible mechanisms for serializing structured data. In other words, protobufs allow engineers faster and simpler ways to handle structured data using a variety of programming languages. For example, an engineer can define a way to organize data in a structured format and use protobufs to generate source code to easily read and write the structured data to and from a variety of data streams using a variety of languages. Protobufs are also extensible to newly received data without invalidating existing data or requiring code to be updated. Further, protobufs maintain backward compatibility and allow for seamless support of changes, including the addition/removal of fields, to any protocol buffer without breaking existing services.

SUMMARY

One aspect of the disclosure provides a computer-implemented method for differential management. The computer-implemented method is executed by data processing hardware that causes the data processing hardware to perform operations including obtaining a first instance of content of a content management system, the first instance including a first plurality of objects of the content. The operations include obtaining a second instance of the content of the content management system, the second instance including a second plurality of objects of the content. The operations also include determining, based on the first instance of the content, a first tree data structure representing the first plurality of objects of the content at the first instance. Further, the operations include determining, based on the second instance of the content, a second tree data structure representing the second plurality of objects of the content at the second instance. The operations include identifying, based on a comparison of the first tree data structure and the second tree data structure, a set of deltas, each delta of the set of deltas indicative of a change in an object of the first plurality of objects of the content between the first instance and the second instance. The operations include transmitting, to a client device, the set of deltas that, when received by the client device, cause the client device to display the set of deltas via a user-interface of the client device.

Implementations of the disclosure may include one or more of the following optional features. In some implementations, the first instance corresponds to a first point in time and the second instance corresponds to a second point in time. In these implementations, the first point in time and the second point in time may be based on a predefined interval. The operations may further include receiving an indication that at least one object of the content has changed and obtaining the second instance of the content is in response to receiving the indication that the at least one object of the content has changed.

Each object of the first plurality of objects and the second plurality of objects may include structured data. The structured data may include protocol buffer objects. In some implementations, the operations further include determining that a first object of the second plurality of objects of the content includes a conflict and, in response to determining that the first object of the second plurality of objects of the content includes the conflict, determining that the first object corresponds to a first delta of the set of deltas. In these implementations, transmitting the set of deltas may further cause the client device to display the first delta of the set of deltas. In these implementations, the operations may further include undoing the change indicated by the first delta in the first object of the second plurality of objects of the content.

In some implementations, determining the first tree data structure further includes, for each first object of the first plurality of objects, determining, based on the respective first object, a first object tree data structure representing the respective first object of the content at the first instance. In these implementations, determining the second tree data structure further includes, for each second object of the second plurality of objects, determining, based on the respective second object, a second object tree data structure representing the respective second object of the content at the second instance.

Another aspect of the disclosure provides a system for differential management. The system includes data processing hardware and memory hardware in communication with the data processing hardware. The memory hardware stores instructions that when executed on the data processing hardware cause the data processing hardware to perform operations. The operations include obtaining a first instance of content of a content management system, the first instance including a first plurality of objects of the content. The operations include obtaining a second instance of the content of the content management system, the second instance including a second plurality of objects of the content. The operations also include determining, based on the first instance of the content, a first tree data structure representing the first plurality of objects of the content at the first instance. Further, the operations include determining, based on the second instance of the content, a second tree data structure representing the second plurality of objects of the content at the second instance. The operations include identifying, based on a comparison of the first tree data structure and the second tree data structure, a set of deltas, each delta of the set of deltas indicative of a change in an object of the first plurality of objects of the content between the first instance and the second instance. The operations include transmitting, to a client device, the set of deltas that, when received by the client device, cause the client device to display the set of deltas via a user-interface of the client device.

This aspect may include one or more of the following optional features. In some implementations, the first instance corresponds to a first point in time and the second instance corresponds to a second point in time. In these implementations, the first point in time and the second point in time may be based on a predefined interval. The operations may further include receiving an indication that at least one object of the content has changed and obtaining the second instance of the content is in response to receiving the indication that the at least one object of the content has changed.

Each object of the first plurality of objects and the second plurality of objects may include structured data. The structured data may include protocol buffer objects. In some implementations, the operations further include determining that a first object of the second plurality of objects of the content includes a conflict and, in response to determining that the first object of the second plurality of objects of the content includes the conflict, determining that the first object corresponds to a first delta of the set of deltas. In these implementations, transmitting the set of deltas may further cause the client device to display the first delta of the set of deltas. In these implementations, the operations may further include undoing the change indicated by the first delta in the first object of the second plurality of objects of the content.

In some implementations, determining the first tree data structure further includes, for each first object of the first plurality of objects, determining, based on the respective first object, a first object tree data structure representing the respective first object of the content at the first instance. In these implementations, determining the second tree data structure further includes, for each second object of the second plurality of objects, determining, based on the respective second object, a second object tree data structure representing the respective second object of the content at the second instance.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Content management systems (CMS), such as systems that maintain web pages, are applications that are used to manage content, allowing multiple contributors to create, edit, and/or publish content. A CMS can regularly receive and implement a large number of changes to content. However, the lack of a robust change management for content management systems has posed significant challenges in accurately tracking and managing changes made by the contributors. The deficiency in change management can result in errors, inconsistencies, and difficulties in effectively managing product content within the CMS.

Implementations herein are directed to a change/differential management system for efficient and accurate tracking of changes in a content management system. The change management system may leverage structured data to determine and/or track changes (referred to herein as "deltas"). In particular, the change management system may convert structured data of the CMS into tree data structures and use tree diffing algorithms to determine the deltas between content (e.g., a web page, a catalogue) at two different points in time. In some implementations, the structured data is in the form of protocol buffer (protobuf) objects.

The differential management system provides significant advantages to maintaining a content management system. For example, precisely and accurately identifying/tracking/managing changes in the content of a content management system can help resolve errors that stem from the changes (e.g., reverting changes to a previous version). Further, tracking changes allows users to understand discrepancies and inconsistencies in the product content without requiring significant manual intervention. Identified errors can also be easily reverted to a previous version that was known to be functional. Further, changes can be propagated to other content (e.g., selectively applying specific changes or consolidated groups of changes as a single cohesive update).

Figure 1:
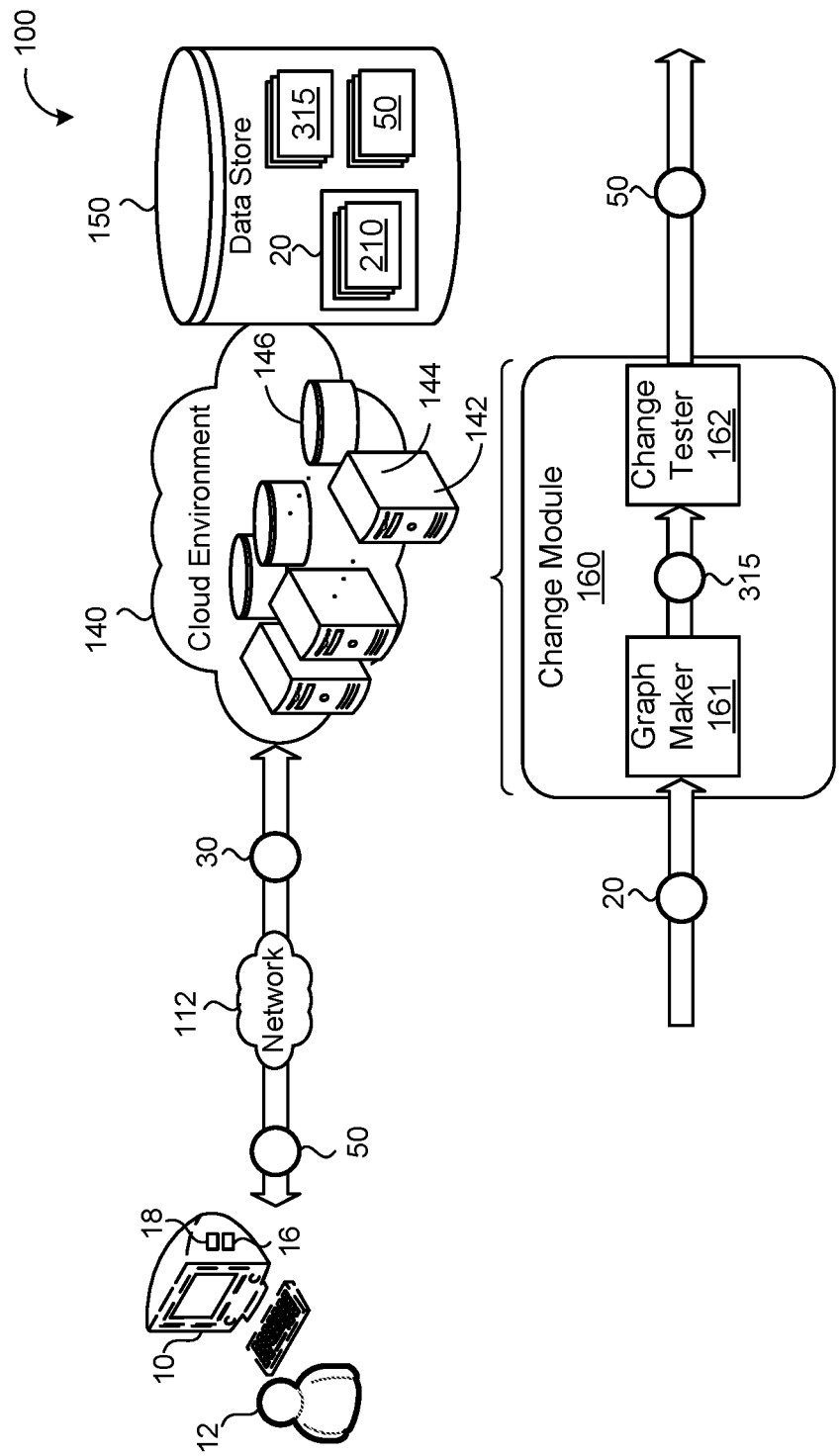
FIG. 1 is a schematic view of an example system for differential management.

Referring to FIG. 1, in some implementations, a differential management system 100 includes a cloud environment 140 (e.g., a high-performance remote server or cluster of high-performance remote servers) in communication with one or more client devices 10 via a network 112. The client device 10 may correspond to any computing device with a user interface and can receive inputs and display outputs, such as a desktop workstation, a laptop workstation, or a mobile device (i.e., a smart phone). The client device 10 includes computing resources 18 (e.g., data processing hardware) and/or storage resources 16 (e.g., memory hardware).

The cloud environment 140 may be a remote environment that is accessible by one or more devices through the Internet. In some implementations, the cloud environment 140 is a content management system allowing one or more contributors (e.g., users 12 of the client device 10) to create, edit, and/or publish content through changes 30. The cloud environment 140 may be a single computer, multiple computers, or a distributed system having scalable/elastic resources 142 including computing resources 144 (e.g., data processing hardware) and/or storage resources 146 (e.g., memory hardware). The cloud environment 140 may be configured to execute a change module 160 for tracking and managing differentials in a content management system (e.g., cloud environment 140). A data store 150 (i.e., a remote storage device) may be overlain on the storage resources 146 to allow scalable use of the storage resources 146 by one or more of the clients (e.g., the client device 10) or the computing resources 144 (e.g., the change module 160). The data store 150 is configured to store a plurality of content 20 for the content management system of the cloud environment 140. The content 20 can include any form of content and/or data constructs for a content management system (e.g., a web page, a database, a catalogue, an inventory) can represent the content 20 in various implementations. The content 20 may include objects 210 related to a web page. The objects 210 may include structured data, such as protobuf objects. For example, when the content 20 includes a web page, the objects 210 can include images, text, videos, web links, etc. related to the web page.

In other implementations, the content management system stores inventory data for a catalogue. In these implementations, the objects 210 of the content 20 of the inventory data can include information related to the inventory of the catalogue such as price, real-time inventory levels, restocking schedules, product availability, skew number, etc. In some implementations, the content management system stores product data. In these implementations, the objects 210 of the content 20 of the product data include information related to the product data such as product descriptions, specifications, pricing, availability, product images, and product videos. Further, the content management system can store promotion data. Here, the objects 210 of the content of the promotion data include information related to discounts, promotions, coupon codes, and/or special offers.

The cloud environment 140 executes the change module 160 for differential management of content 20. The change module 160 may obtain the content 20, including the objects 210. In some implementations, the change module 160 includes a cache memory to store one or more copies of content 20 and then obtains new versions of the same content 20. The change module 160 can then generate, via graph maker 161, one or more tree data structures 315 to represent the content 20 and corresponding objects 210.

The change module 160, via the change tester 162, may then compare the tree data structures 315 of content 20 at a first instance in time (e.g., the copy of the content 20 stored at the cache memory), to the tree data structures 315 of the content 20 at a second instance in time (e.g., a current version of the content 20). The change tester 162 may then determine any deltas that exist in the content 20. The deltas 50 may correspond to any change 30 made at the content 20 (e.g., by the user 12). For example, when the content 20 is a web page, the deltas 50 can correspond to changes in text, images, links, layout, headers, new objects, removal of objects, etc. Further, the change module 160 may determine that one or more of the deltas 50 correspond to a conflict or an error. In some implementations, the change module 160 is configured to revert the object 210 corresponding any deltas 50 that correspond to conflicts/errors back to the original object 210 at the first instance. For example, when the content 20 is a web page, if a user inputs three changes 30 to three objects 210 of a web page that are erroneous, the change module 160, when determining the deltas 50, may determine that the changes 30 are erroneous and/or cause some issue with the web page. The change module 160 may then revert the three objects 210 back to an original value prior to receiving the changes 30 (e.g., back to the objects 210 values at the first instance of the web page).

Figure 4:
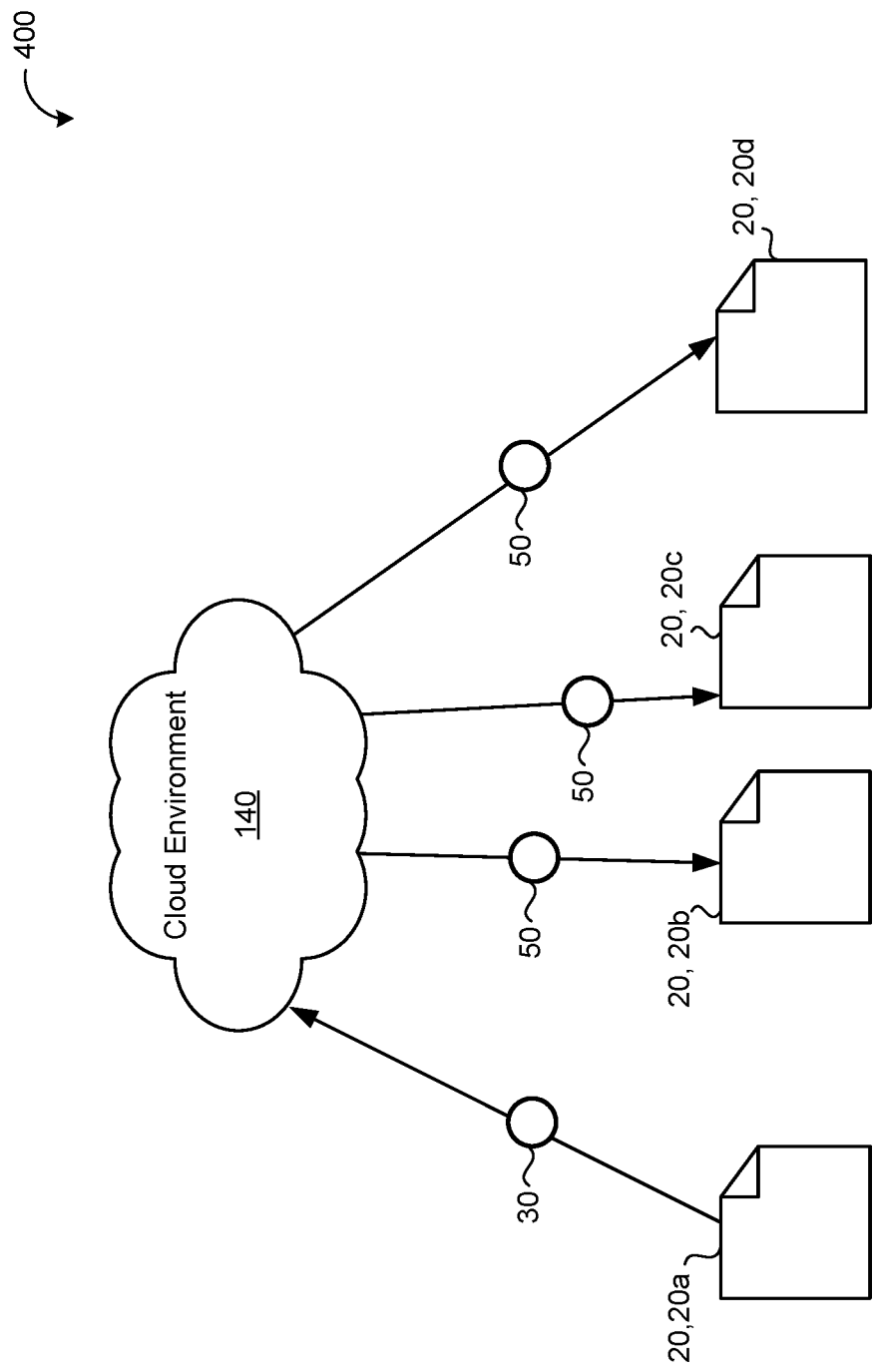
FIG. 4 is a schematic view of an example of differential management for multiple versions of content.

In some implementations, the change module 160 transmits the deltas 50 to the client device 10, causing the client device to display the deltas 50. The client device may display the deltas 50 as a list of changes. Alternatively, the client device may display the deltas 50 as part of the content 20, with the changes 30 highlighted. In some implementations, the change module 160 determines that the deltas 50 should be applied to other content 20. In these implementations, the change module 160 propagates the changes 30 to the appropriate content 20, as discussed in greater detail below (FIG. 4).

The system 100 of FIG. 1 is presented for illustrative purposes only and is not intended to be limiting. For example, although only a single example of each component is illustrated, the system 100 includes any number of components 10, 140, 150, and 205. Further, although some components are described as being located in the cloud environment 140, in some implementations, some or all of the components are hosted locally on the client device 10. Further, in various implementations, some or all of the components 150, 160, and 205, are hosted locally on client device 10, remotely (such as in the cloud environment 140), or some combination thereof. Further, the content management system can manage any suitable content and related changes 30.

Figure 2A:
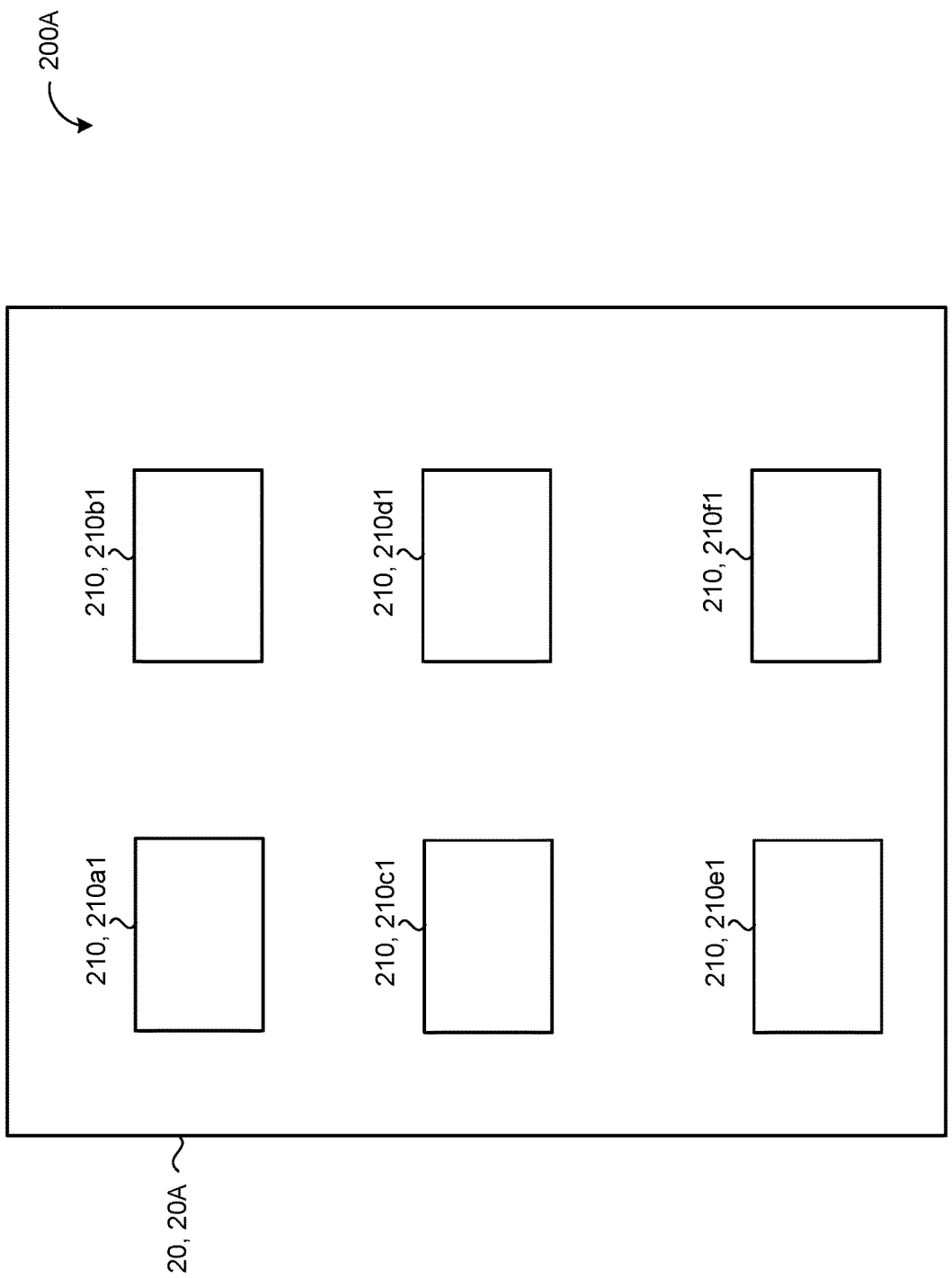
FIG. 2A is a schematic view of an example of a first instance of content including structured data.

FIG. 2A is a schematic view 200A of an example of a first instance of content 20, 20A including objects 210, 210a1-f1.

Each object 210 may correspond to structured data (e.g., protobuf objects) related to the content 20A at the first instance of time. For example, when the content 20 corresponds to a web page, the objects 210 can correspond to text, layouts, links, etc. The first instance of the content 20A may correspond to a historical version of the content 20 that is stored in a memory (such as a data cache). In some implementations, the objects 210 of the content 20A are converted into tree data structures 315.

Figure 2B:
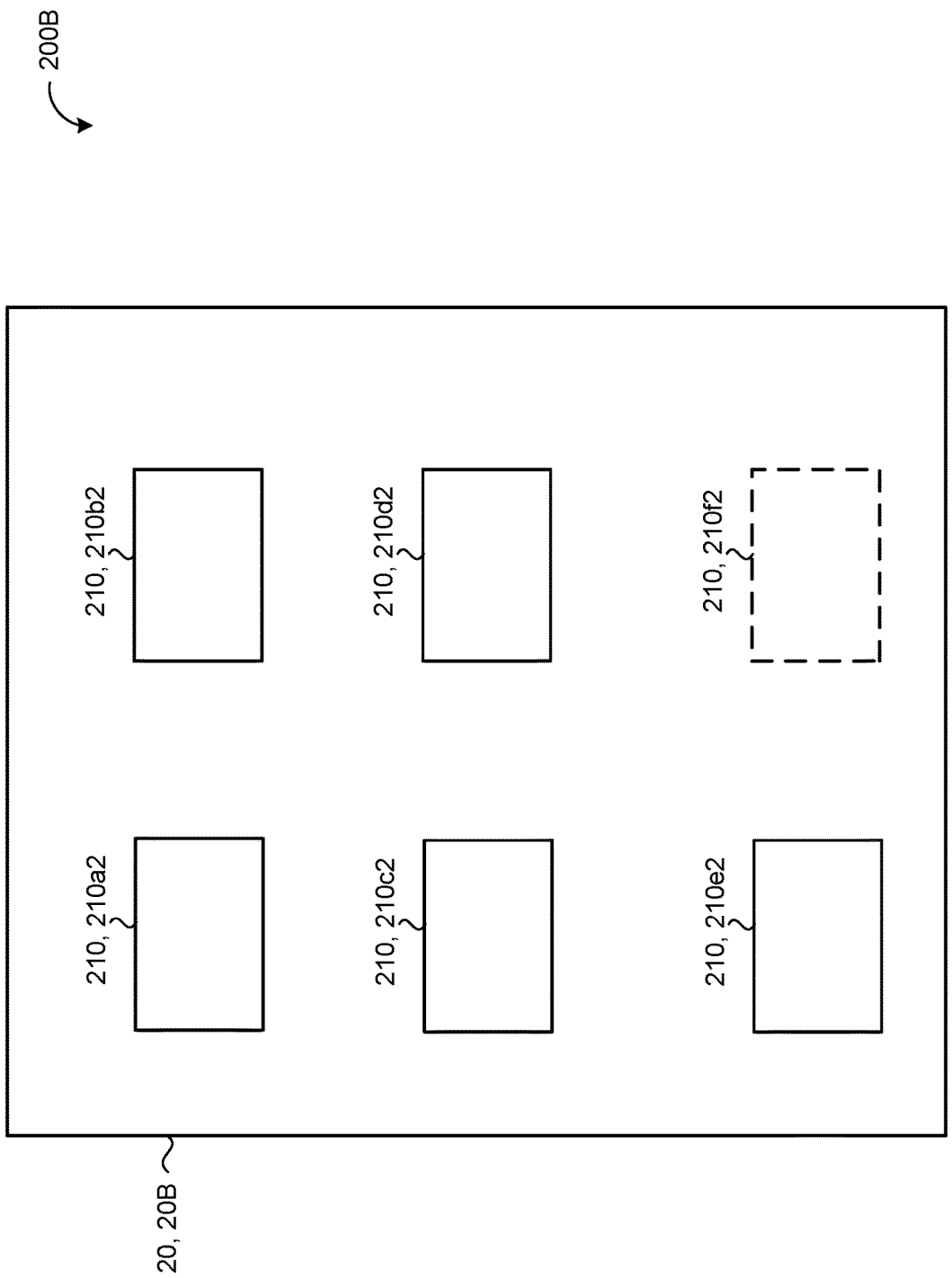
FIG. 2B is a schematic view of an example of a second instance of content including structured data.

FIG. 2B is a schematic view 200B of an example of a second instance of a content 20, 20B including objects 210, 210a2-f2. Each object 210 may correspond to structured data (e.g., protobuf objects) related to the content 20B at the second instance of time. For example, the content 20B may correspond to the same content 20 as content 20A of FIG. 2A, just at a different time. In some implementations, the second instance of the content 20B will be obtained at a predetermined time interval from a time corresponding to the first instance of the content 20A. In other implementations, the second instance of the content 20B will be obtained in response to an indication that a change 30 has been received at the content 20A. The second instance of the content 20B may correspond to a current version of the content 20 that is obtained (e.g., through the Internet). In some implementations, the objects 210 of the content 20B are converted into tree data structures 315 (also referred to herein as tree diagrams 315) and then compared (using a differential algorithm) to the tree data structures 315 corresponding to the objects 210 of the first instance of the content 20A.

In the example of FIGS. 2A and 2B, the object 210/1 (FIG. 2A) of the first instance of the content 20A is different from the object 210/2 (FIG. 2B) of the second instance of the content 20B. The change module 160 (FIG. 1) may identify a delta based on the difference between the first instance of the content 20A and the second instance of the content 20B. For example, if the object 210/2 is deleted, then the delta 50 indicates that the object 210/1 has been deleted. In another example, if the object 210/2 is changed (i.e., has been modified) at the second instance of the content 20B, the delta 50 indicates the changes that have been made from the object 210/1 of the first instance of the content 20A.

Identifying and managing deltas 50 may provide many benefits in a content management system. For example, if two users are making changes to content 20 (e.g., objects 210 of a web page) simultaneously, those changes 30 are based on a first instance of the content 20 and not based on the changes 30 made by the corresponding other user, which can lead to discrepancies and/or inconsistencies. Identifying deltas 50 can provide insight into which changes 30 led to the discrepancies. Accordingly, the problematic changes can be reverted or reversed. For example, if a first user is making changes to an object 215, and a second user deletes the object 215, the delta identifies that the deletion of the object 215 led to an error. In turn, the object 215 may be reinstated.

Figure 3:
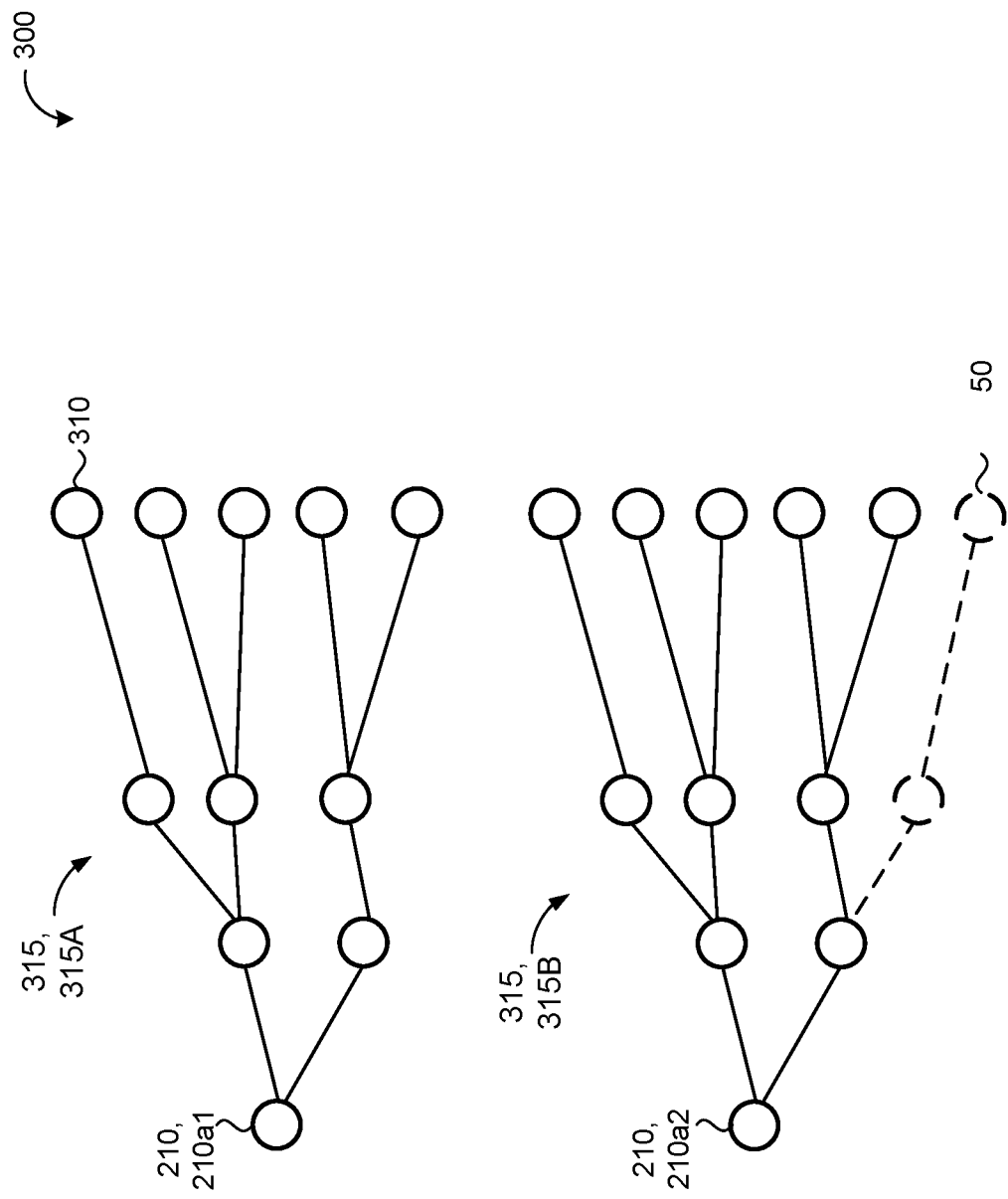
FIG. 3 is a schematic view of an example of comparing structured data objects as tree data structures.

FIG. 3 illustrates a schematic view 300 of two example tree diagrams 315, 315A-B corresponding to an object 210 of content 20 at two instances in time. In some implementations, the tree diagrams 315 are generated by the graph maker 161 (FIG. 1). The example tree data structures 315A and 315B have a parent-child node structure (illustrated from left to right) where each child node has at least one parent node. Each path from parent node to child node of the tree diagram 315 may represent the corresponding object 210. For example, the object 210, 210*a1* represented by the tree data structure 315A may represent a structured data component (e.g., a protobuf object) of content 20 at a first instance in time. Meanwhile, the object 210, 210*a*2 represented by the tree data structure 315B may represent the structured data component of the content 20 at a second instance of time. The delta 50 represents data that is added to the object 210*a*2. The example delta 50 of FIG. 3 is not intended to be limiting, and a delta 50 can represent any change to an object 210, such as an edit, an addition, a removal, etc. In some implementations, a change tester 162 (FIG. 1) can perform a diffing algorithm to determine the differences between the tree data structure 315A and the tree data structure 315B.

The example of FIG. 3 is for illustrative purposes only and is not intended to be limiting. For example, although the tree data structures 315A and 315B each represent a single object 210, a tree data structure 315 can represent multiple objects. In some implementations, such as when content 20 corresponds to a web page, the entire web page can be represented as a single tree data structure 315, where portions of the tree data structure 315 can correspond to objects 210 of the web page (e.g., the tree data structures 315 of the objects 210 are interconnected into a large tree data structure 315 representative of the entire web page). In other implementations, each object 210 of content 20 can be converted into a tree data structure 315, and those can each be maintained separately and then compared to other corresponding tree data structures 315 for similar objects 210 at different instances (e.g., at different points in time or in corresponding versions of content 20).

FIG. 4 is a schematic view 400 of an example of differential management for multiple versions of content 20. For example, the content 20 may correspond to a web page, and the web page may have a number of corresponding versions, such as web pages 20, 20*a-d* in different languages (i.e., a first language, a second language, a third language, and a fourth language in this example). When a change 30 is made to one web page 20*a*, the change 30 may be propagated, based on the delta 50, to each other version of the web page 20*b-d*. In some implementations, the change 30 is only propagated to a subset of the web pages 20*b-d*. For example, if the change 30 is received at an English version of the web page 20*a*, the corresponding delta 50 is propagated to other web sites corresponding to countries in North America, such as a Spanish version of the web page 20*b*, but not to other versions (e.g., web pages 20*c-d*). As each web page 20 is represented as tree data structures 315, it may be easy to propagate the changes in one tree data structure 315 to each other tree data structure 315 by making the change at the corresponding node(s). Although the example of FIG. 4 is described with respect to different versions of web pages 20*a-d*, the content 20 can correspond to any content 20 of a content management system, as described herein.

Figure 5:
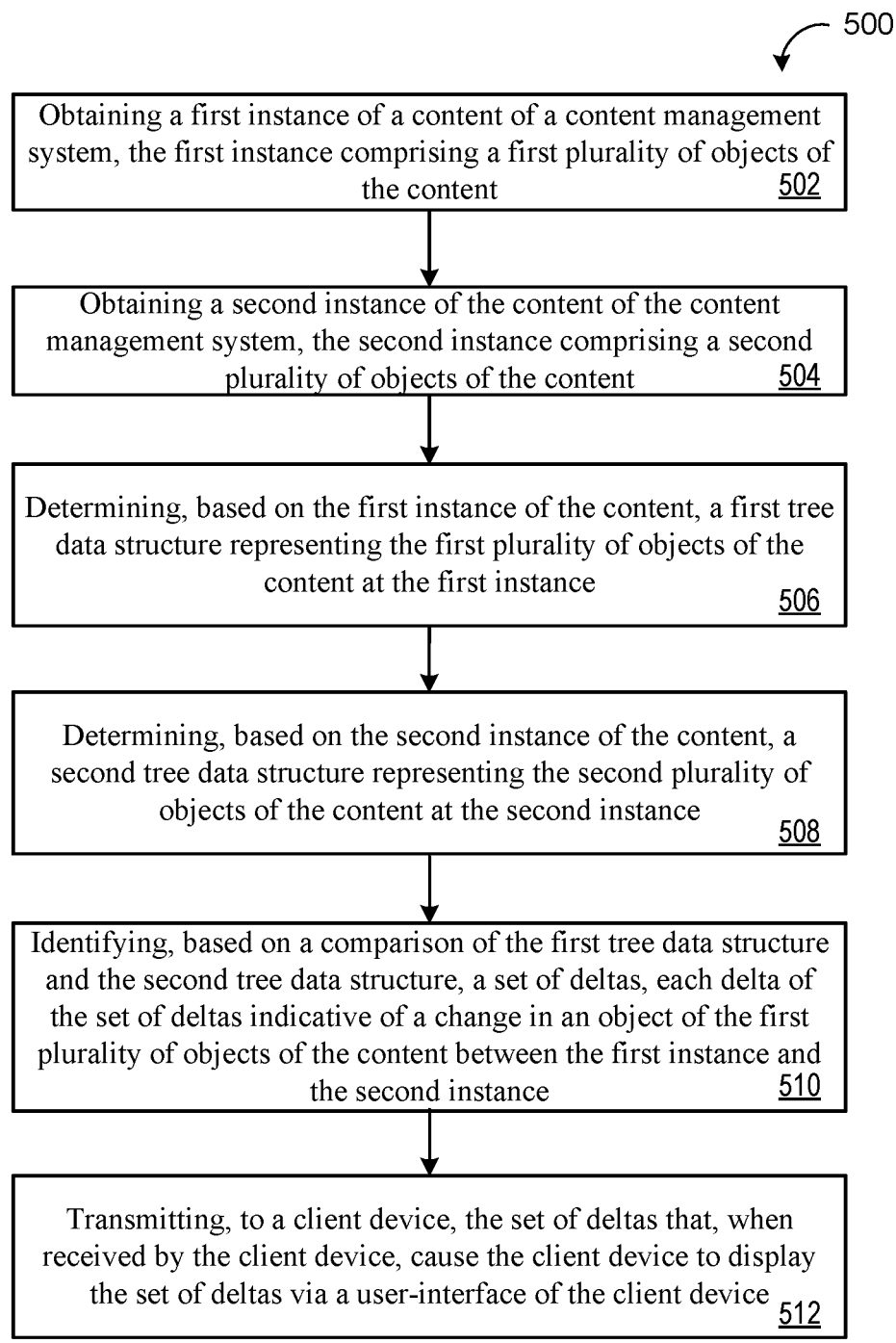
FIG. 5 a flowchart of an example arrangement of operations for a method of differential management.

FIG. 5 is a flowchart of an exemplary arrangement of operations for a method 500 of differential management. The method 500 can be performed by various interconnected computing devices of a computing system, such as the components of the system 100 of FIG. 1 and/or the computing device 600 of FIG. 6. At operation 502, the method 500 includes obtaining a first instance of content 20 of a content management system, the first instance including a first plurality of objects 210 of the content 20. At operation 504, the method 500 includes obtaining a second instance of the content 20 of the content management system, the second instance including a second plurality of objects 210 of the content 20. At operation 506, the method 500 includes determining, based on the first instance of the content 20, a first tree data structure 315 representing the first plurality of objects 210 of the content 20 at the first instance. Further, at operation 508, the method 500 includes determining, based on the second instance of the content 20, a second tree data structure 315 representing the second plurality of objects 210 of the content 20 at the second instance. At operation 510, the method 500 includes identifying, based on a comparison of the first tree data structure 315 and the second tree data structure 315, a set of deltas 50, each delta 50 of the set of deltas 50 indicative of a change 30 in an object 210 of the first plurality of objects 210 of the content 20 between the first instance and the second instance. At operation 512, the method 500 includes, transmitting, to a client device 10, the set of deltas 50 that, when received by the client device 12, cause the client device 12 to display the set of deltas 50 via a user-interface of the client device 10.

Figure 6:
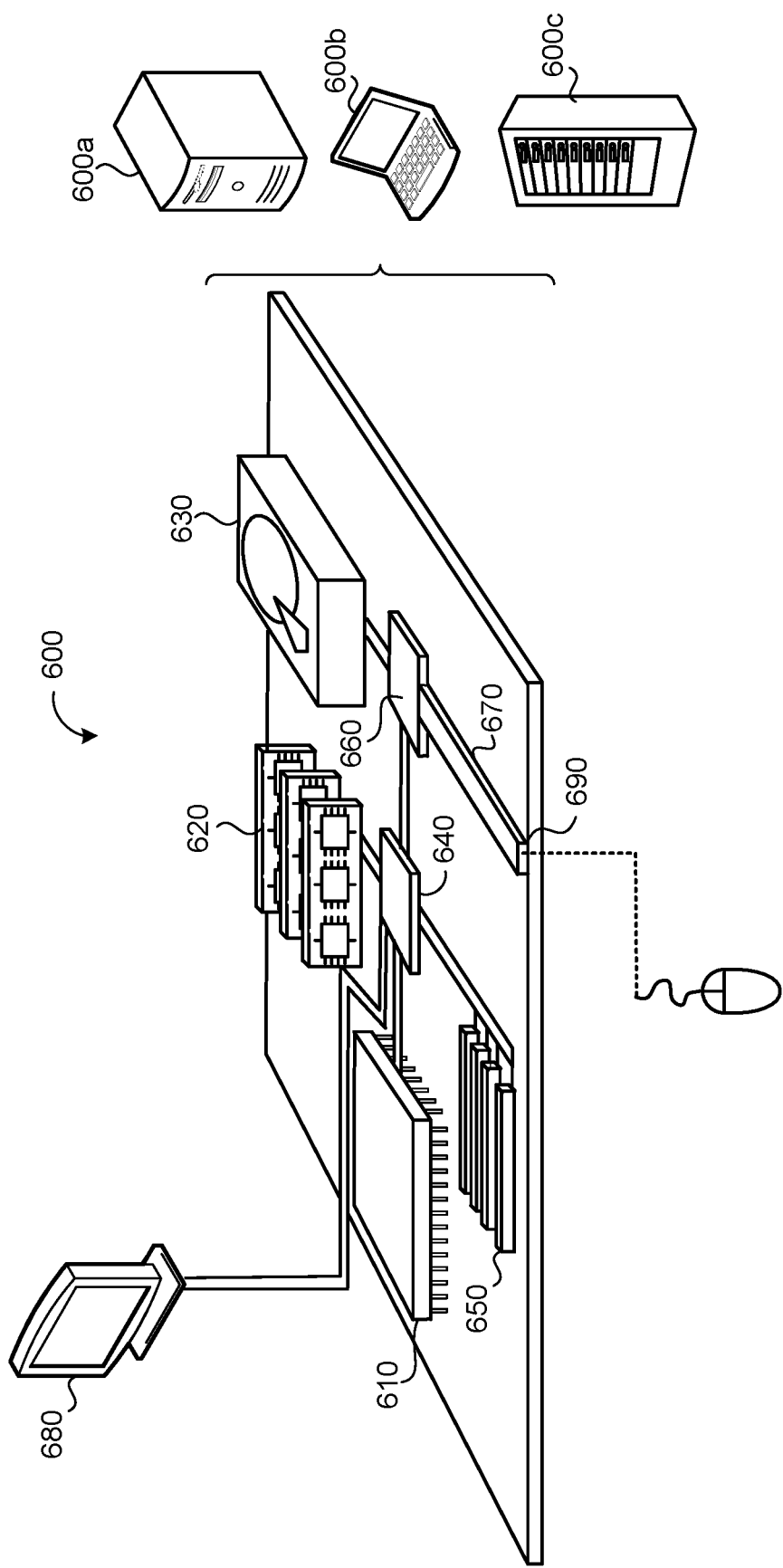
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
  obtaining, by data processing hardware, a first instance of content of a content management system, the first instance comprising a first plurality of objects of the content;
  obtaining, by the data processing hardware, a second instance of the content of the content management system, the second instance comprising a second plurality of objects of the content;

determining, by the data processing hardware and based on the first instance of the content, a first tree data structure representing the first plurality of objects of the content at the first instance;

determining, by the data processing hardware and based on the second instance of the content, a second tree data structure representing the second plurality of objects of the content at the second instance;

identifying, by the data processing hardware and based on a comparison of the first tree data structure and the second tree data structure, a set of deltas, each delta of the set of deltas indicative of a change in an object of the first plurality of objects of the content between the first instance and the second instance;

determining, by the data processing hardware, whether a first object of the second plurality of objects of the content includes a conflict with a first object of the first plurality of objects;

responsive to determining that the first object of the second plurality of objects of the content includes the conflict with the first object of the first plurality of objects, determining, by the data processing hardware, that the first object of the second plurality of objects of the content corresponds to a first delta of the set of deltas; and storing, by the data processing hardware, the first delta for retrieval.

2. The method of claim 1, wherein the first instance corresponds to a first point in time and the second instance corresponds to a second point in time.

3. The method of claim 2, wherein the first point in time and the second point in time are based on a predefined interval.

4. The method of claim 1, further comprising:
receiving, by the data processing hardware, an indication that at least one object of the content has changed; and
wherein obtaining the second instance of the content comprises obtaining, by the data processing hardware, the second instance of the content responsive to receiving the indication that the at least one object of the content has changed.

5. The method of claim 1, wherein each object of the first plurality of objects and the second plurality of objects comprises structured data.

6. The method of claim 5, wherein the structured data comprises protocol buffer objects.

7. The method of claim 1,
wherein the set of deltas, when received by a client device, further cause the client device to display the first delta of the set of deltas.

8. The method of claim 7, further comprising undoing the change indicated by the first delta in the first object of the second plurality of objects of the content.

9. The method of claim 1, wherein the content comprises one or more of:
a catalogue;
a product page;
a web page; or
a promotional offer.

10. The method of claim 1, wherein:
determining the first tree data structure further comprises, for each respective object of the first plurality of objects, determining, by the data processing hardware and based on the respective object of the first plurality of objects, a first object tree data structure representing the respective object of the first plurality of objects; and determining the second tree data structure further comprises, for each respective object of the second plurality of objects, determining, by the data processing hardware and based on the respective object of the second plurality of objects, a second object tree data structure representing the respective object of the second plurality of objects of the content at the second instance.

11. A computing system comprising:
data processing hardware; and
memory hardware in communication with the data processing hardware, the memory hardware storing instructions that when executed on the data processing hardware cause the data processing hardware to:
obtain a first instance of content of a content management system, the first instance comprising a first plurality of objects of the content;
obtain a second instance of the content of the content management system, the second instance comprising a second plurality of objects of the content;
determine, based on the first instance of the content, a first tree data structure representing the first plurality of objects of the content at the first instance;
determine, based on the second instance of the content, a second tree data structure representing the second plurality of objects of the content at the second instance;
identify, based on a comparison of the first tree data structure and the second tree data structure, a set of deltas, each delta of the set of deltas indicative of a change in an object of the first plurality of objects of the content between the first instance and the second instance;
determine whether a first object of the second plurality of objects of the content includes a conflict with a first object of the first plurality of objects;
responsive to determining that the first object of the second plurality of objects of the content includes the conflict with the first object of the first plurality of objects, determine that the first object of the second plurality of objects of the content corresponds to a first delta of the set of deltas; and
store the first delta for retrieval.

12. The computing system of claim 11, wherein the first instance corresponds to a first point in time and the second instance corresponds to a second point in time.

13. The computing system of claim 12, wherein the first point in time and the second point in time are based on a predefined interval.

14. The computing system of claim 11, wherein the instructions further cause the data processing hardware to:
receive an indication that at least one object of the content has changed; and
wherein the instructions that cause the data processing hardware to obtain the second instance of the content further cause the data processing hardware to obtain the second instance of the content in response to receiving the indication that the at least one object of the content has changed.

15. The computing system of claim 11, wherein each object of the first plurality of objects and the second plurality of objects comprises structured data.

16. The computing system of claim 15, wherein the structured data comprises protocol buffer objects.

17. The computing system of claim 11,
wherein the set of deltas, when received by a client device, further cause the client device to display the first delta of the set of deltas.

18. The computing system of claim 17, wherein the instructions further cause the data processing hardware to undo the change indicated by the first delta in the first object of the second plurality of objects of the content.

19. The computing system of claim 11, wherein the content comprises one or more of:
- a catalogue;
- a product page;
- a web page; or
- a promotional offer.

20. The computing system of claim 11, wherein:
- the instructions that cause the data processing hardware to determine the first tree data structure further cause the data processing hardware to, for each respective object of the first plurality of objects, determine, based on the respective object of the first plurality of objects, a first object tree data structure representing the respective object of the first plurality of objects; and
- the instructions that cause the data processing hardware to determine the second tree data structure further cause the data processing hardware to, for each respective object of the second plurality of objects, determine, based on the respective object of the second plurality of objects, a second object tree data structure representing the respective object of the second plurality of objects of the content at the second instance.

\* \* \* \* \*